(12) United States Patent
Daniel

(10) Patent No.: US 6,464,241 B1
(45) Date of Patent: Oct. 15, 2002

(54) GOOSENECK TRAILER HITCH

(76) Inventor: Jeffrey Daniel, 7502 Mason Rd., Houston, TX (US) 77002

( * ) Notice: Subject to any disclaimer, the term of this patent is extended or adjusted under 35 U.S.C. 154(b) by 0 days.

(21) Appl. No.: 09/721,366

(22) Filed: Nov. 22, 2000

(51) Int. Cl.[7] ................................................ B60D 1/06
(52) U.S. Cl. ...................................... 280/512; 280/510
(58) Field of Search ................................ 280/504, 508, 280/509, 510, 511, 512, 513, 417.1, 425.2, 441.2

(56) References Cited

U.S. PATENT DOCUMENTS

| | | | |
|---|---|---|---|
| 2,153,309 A | * | 4/1939 | Milz et al. |
| 2,951,711 A | * | 9/1960 | Karnath et al. |
| 3,955,831 A | | 5/1976 | Whitchurch |
| 3,986,727 A | | 10/1976 | Cox |
| 4,063,749 A | | 12/1977 | Tracy et al. |
| 4,088,339 A | | 5/1978 | Sagebiel |
| 4,168,847 A | | 9/1979 | Westphal |
| 4,283,073 A | | 8/1981 | Gostomski et al. |
| 4,360,217 A | | 11/1982 | Pittman |
| 4,367,884 A | | 1/1983 | Johnson et al. |
| 4,390,192 A | | 6/1983 | Wagner |
| 4,699,395 A | | 10/1987 | Hale |
| 5,147,096 A | | 9/1992 | Rogers |
| 5,219,436 A | * | 6/1993 | Abbott ...................... 280/512 |
| 5,263,735 A | | 11/1993 | Mann |
| 5,385,363 A | | 1/1995 | Morey ........................ 280/512 |
| 5,433,467 A | | 7/1995 | Easterwood |
| 5,482,309 A | * | 1/1996 | Hollis ...................... 280/423.1 |
| 5,513,871 A | | 5/1996 | Johnson |
| 5,683,094 A | | 11/1997 | Gullickson .................. 280/513 |
| 5,967,541 A | * | 10/1999 | Johansen .................... 280/504 |

* cited by examiner

*Primary Examiner*—Anne Marie Boehler
(74) *Attorney, Agent, or Firm*—Bracewell & Patterson, L.L.P.

(57) ABSTRACT

A gooseneck trailer hitch formed of a top plate pivotally attached to a base plate, wherein each plate is formed by investment casting and the components and features of each plate are integrally formed therewith. The top plate is an elongated structure that includes an aperture through which a trailer ball can pass, a ball housing concentrically located over the aperture and a tab at one end of the plate. The base plate is an elongated structure that includes an aperture through which a trailer ball can pass and a spring enclosure formed at one end of the plate, the enclosure including a slot into which the tab of the top plate extends. Contained within the spring enclosure is a spring that bears against the tab. The top plate is pivotally mounted on the base plate so that the two apertures are concentrically aligned, thus permitting a trailer ball to pass through the base plate aperture and seat in the ball housing formed as part of the top plate. By bearing against the tab of the top plate, the spring forces the two apertures out of alignment, thereby shifting the top plate and the base plate relative to one another. When the hitch is mounted on a trailer ball, the plates, when out of alignment, function as an automatic lock that holds the hitch to the ball.

11 Claims, 3 Drawing Sheets

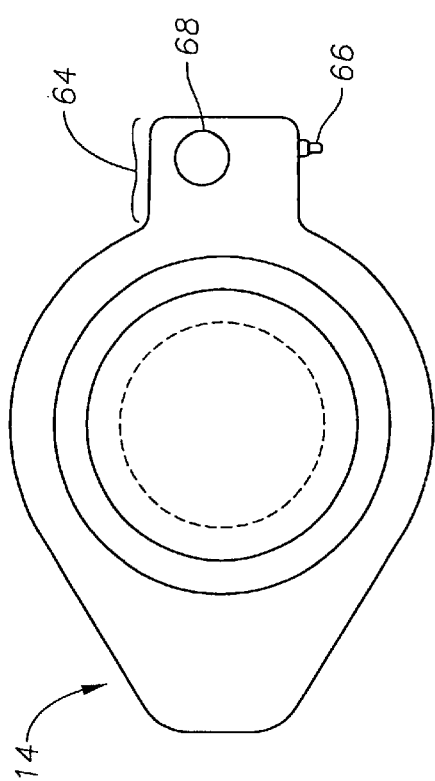
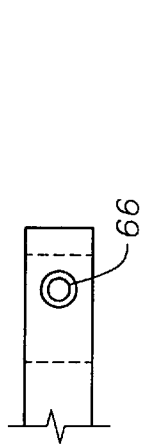
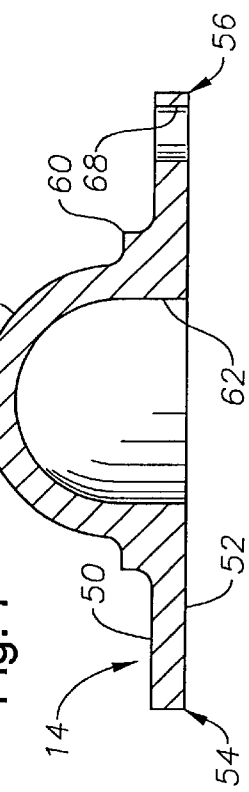
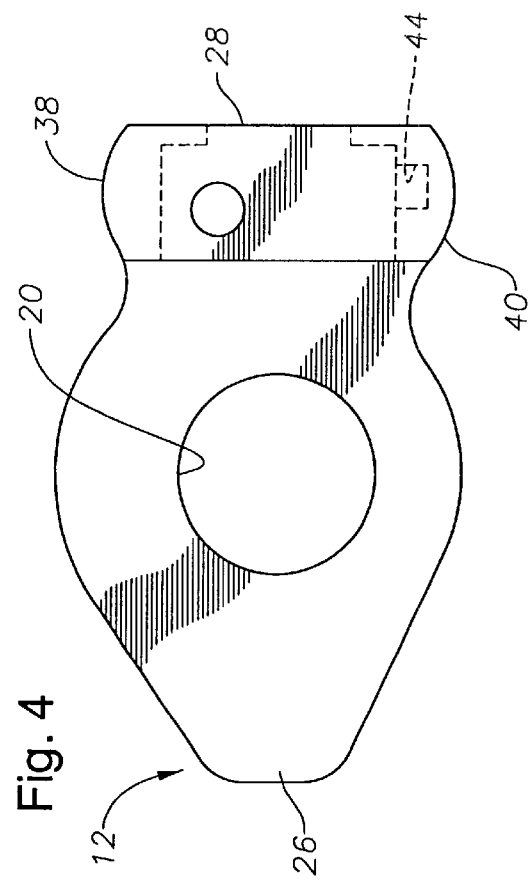
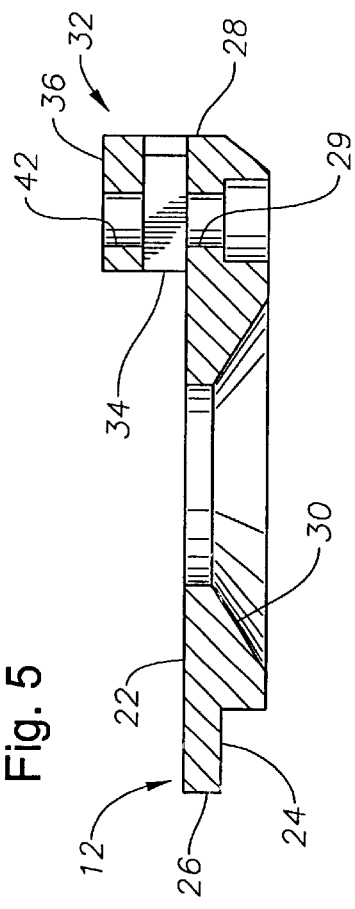

GOOSENECK TRAILER HITCH

BACKGROUND OF INVENTION

1. Field of Invention

This invention relates to trailer hitches and more specifically to a coupling mechanism on a gooseneck trailer hitch of the ball type.

2. Description of the Prior Art

A typical gooseneck trailer hitch is made up of an L shaped structure with a socket or cavity at the bottom end of the vertical portion of the L shaped structure. The socket or cavity is generally formed in a coupler foot plate that attaches to a round or square vertical steel tube or post, such that the foot plate receives the trailer hitch ball mounted on the vehicle which is to tow the trailer. The vertical tube is rigidly and permanently affixed to the horizontal portion of the L shaped structure, which in turn is attached to the front of the trailer.

The coupler at the lower end of the post generally connects with a receiving device, such as a ball, on a pull vehicle. The gooseneck trailer coupler itself is made up various configurations to secure the coupler to the ball. Many gooseneck trailer couplers include front and rear facing portions, one portion usually including a lever that operates to "lock" and "unlock" the coupler. The coupler lever is generally made up of a cylindrical bar having a vertical component which penetrates an aperture in the foot plate and/or a locking plate of the coupler and a horizontal component at its upper end by which the user may grasp the lever. Alternatively, the securing mechanism might consist of a horizontal pin that slides through the vertical post adjacent the foot plate.

With a lever thus described, to couple a gooseneck trailer to a pull vehicle requires manipulation of the coupler lever. Manipulation is usually performed by initially raising the coupler lever vertically so that vertical component is removed from the aperture in the foot plate, thereby allowing the securing mechanism to be positioned to either accept or release the receiving device of the pull vehicle ("open" or "unlock" position). After the socket has received the receiving device on the pull vehicle, the coupler lever is released, whereupon the vertical component again is received by the foot plate aperture, thereby returning the coupler lever to its original resting position ("closed" or "locked" position).

U.S. Pat. No. 5,683,094 is illustrative of a gooseneck coupler mechanism incorporating a coupler lever as described above. As shown therein, the locking mechanism for the device consists of a vertically actuable coupler lever that is urged against an apertured locking plate. In order to release or secure the coupler mechanism, the coupler lever is pulled upward to allow the aperture of the locking plate to be moved into or out of alignment with the receiving device or ball. Once the locking plate is properly positioned, the coupler lever is released to secure the locking plate in the desired position.

U.S. Pat. No. 4,168,847 illustrates a horizontal pin type locking mechanism as referenced above. Specifically, a socket or cavity is illustrated at one end of the vertical post, the socket disposed to receive the towing ball on the vehicle for coupling and uncoupling. A horizontal retainer pin is provided extending along the inner edge of the cavity. The pin is not in place during coupling or uncoupling, but can be inserted in the coupling member once the ball is in the cavity. The ball diameter is such that it cannot move out of the cavity with the pin in place, thereby firmly securing the hitch together.

Another type of mechanism to secure the coupler to a ball is illustrated in U.S. Pat. No. 5,385,363, where there is shown an apertured foot plate pivotally attached to an apertured locking plate such that the apertures of the two plates can align when so desired. An exposed, external spring is used to urge the apertures of the two plates out of alignment under "rest" conditions. Under the force of the ball passing through the misaligned apertures of the two plates and against the force of the spring, the two plates pivot relative to one another until the apertures are sufficiently aligned to permit the ball to pass there through. Once the ball has passed through the plates, the spring urges the two apertures out of alignment once again, such that the misaligned plates secure around the lower portion or neck of the ball. A vertical retaining pin, similar to the coupler lever described above, may then be used to "lock" the plates in the rest position so that the ball cannot pull back through.

One drawback to a coupler mechanism such as is illustrated in the '363 patent is that the spring mechanism used to urge the two plates out of alignment is externally attached to the plates that is necessitated by the manner in which the hitch is fabricated. In the '363 patent, the foot plate includes a bridge portion that extends around the locking plate. The spring is then externally mounted on the bridge portion and attaches on an external portion of the locking plate utilizing externally mounted eyelets. In any event, being exposed and unprotected, the spring may be easily damage or otherwise interfered with.

Another drawback to gooseneck trailer hitches of the prior art is the current method of manufacture, as is illustrated by the '363 patent and the '094 patent. As can be seen in these prior art patents, existing hitches are typically fabricated utilizing hot rolled sheet metal that is cut into the various components of the hitch. To permit sheet metal tooling such as sheering, bending, and machining, the sheet metal is typically low in carbon content, such as 1012 or 1015 low-carbon steel. During the formation process, the sheet metal is commonly stretch formed around a die to created the desired hitch components. While the steel already is lower in strength due to the lower carbon content, such forming processes can weaken the steel even further, shorten the fatigue life and render the components susceptible to stress induced fatigue. For example, in the '363 patent, the dome of the hitch that overlays the apertured plates is stretch formed by pressing a flat portion of sheet metal around a ball-shaped die. Those skilled in the art will recognize that the resulting circumference and shape of the dome is developed entirely at the expense of sheet thickness and strain distribution at the top of the dome. Yet since the dome rests against the ball, the dome is the portion of the hitch that typically endures the most strain under normal operating circumstances. For this reason, failure of many of the prior art hitches begins to first occur in the dome, which, as shown above, is accelerated by the fabrication manner of the domes of the prior art coupler mechanisms.

It is also difficult to manufacture intricate components or component features in the prior art coupler mechanisms using the hitch fabrication techniques of the prior art. The nature of forming makes it difficult for the dies and cutting tools to access certain portions of the components, such as internal surfaces or small recesses and the like, to form such features. Thus, such components are typically limited to features, whatever their purpose, that can be created on the outer exposed surface of a component.

In any event, once the various components are created, they are typically welded together as shown in the '094 patent. Welding has several drawbacks, such as for example, bad welds can yield a product that is inherently "weak" along the weld points, welding is typically more costly than an a product that is fabricated without welding, welding is more subject to human error and discretion and welding is generally requires more resources and a longer time for fabrication and assembly.

Finally, the fabrication method of cutting and welding as described above is inherently imprecise. Bending is difficult to replicate to tight tolerances and alignment of various components for welding is subject to the relative placement of the parts by the welder. In addition, the dies used in cutting and forming the steel are subject to wear. All of these factors can result in part dimensions that can vary as much as ±5 inches.

In light of the foregoing, it would therefore be desirable to provide a gooseneck trailer mechanism that better protects the spring or other components utilized to secure the mechanism in the desired engagement position. Such a hitch would be manufactured to have much tighter tolerances than the devices of the prior art and would be much more durable than the prior art devices. In addition, such a hitch should still be easily and quickly manufactured, while permitting various features to be formed on portions of the hitch that are not accessible by machining equipment.

SUMMARY OF INVENTION

The present invention provides a gooseneck trailer hitch that incorporates an engagement mechanism spring seated within a protective enclosure. Defined within the protective enclosure is a spring seat that is integrally formed therein for receiving the spring. More specifically, the hitch includes a base plate, a top plate pivotally attached to the base plate, an engagement spring for urging the base plate and the top plate into a trailer ball securing relationship, and a locking handle for locking the base plate and the top plate into a securing relationship relative to one another. The mechanism is essentially comprised of two elements, namely the base plate and the top plate with the features for each element integrally formed therewith. Specifically, these two elements are formed by investment casting thereby permitting various features to be molded into the piece at the time of creation. In the preferred embodiment, a nipple for securing the spring to the top plate is formed on the top plate shoulder that extends into a spring enclosure formed on the base plate. Likewise, a spring seat or pocket is formed within the spring enclosure for receiving and securing the spring to the base plate. A ball seat may also be cast into the surface of the base plate to enhance seating of the hitch on a ball. Because the hitch is formed of two basic components that have all of the necessary elements integrally cast into the components, the hitch requires no welding of various components of the of the base plate or top plate to complete assembly yet still is provided with internally formed features such as the nipples and spring seat. In addition, the hitch can be formed of higher carbon steel than the prior art because the material utilized in formation of the base plate and top plate need not be malleable for the bending and stretch forming that characterizes the fabrication processes of the prior art. Thus, by utilizing investment casting, the hardness of the hitch and strength of the components can be increased. Finally, the hitch can be specifically manufactured to place additional material in those portions of the hitch that are likely to experience the highest loads, such as the hitch dome.

BRIEF DESCRIPTION OF THE DRAWINGS

FIG. 4 is a top view of the base plate.

FIG. 5 is a cross-sectional view of the base plate.

FIG. 6 is a top view of the top plate.

FIG. 6A is a side view of the tab.

FIG. 7 is a cross-sectional view of the top plate.

DESCRIPTION OF THE PREFERRED EMBODIMENT

Figure 1:
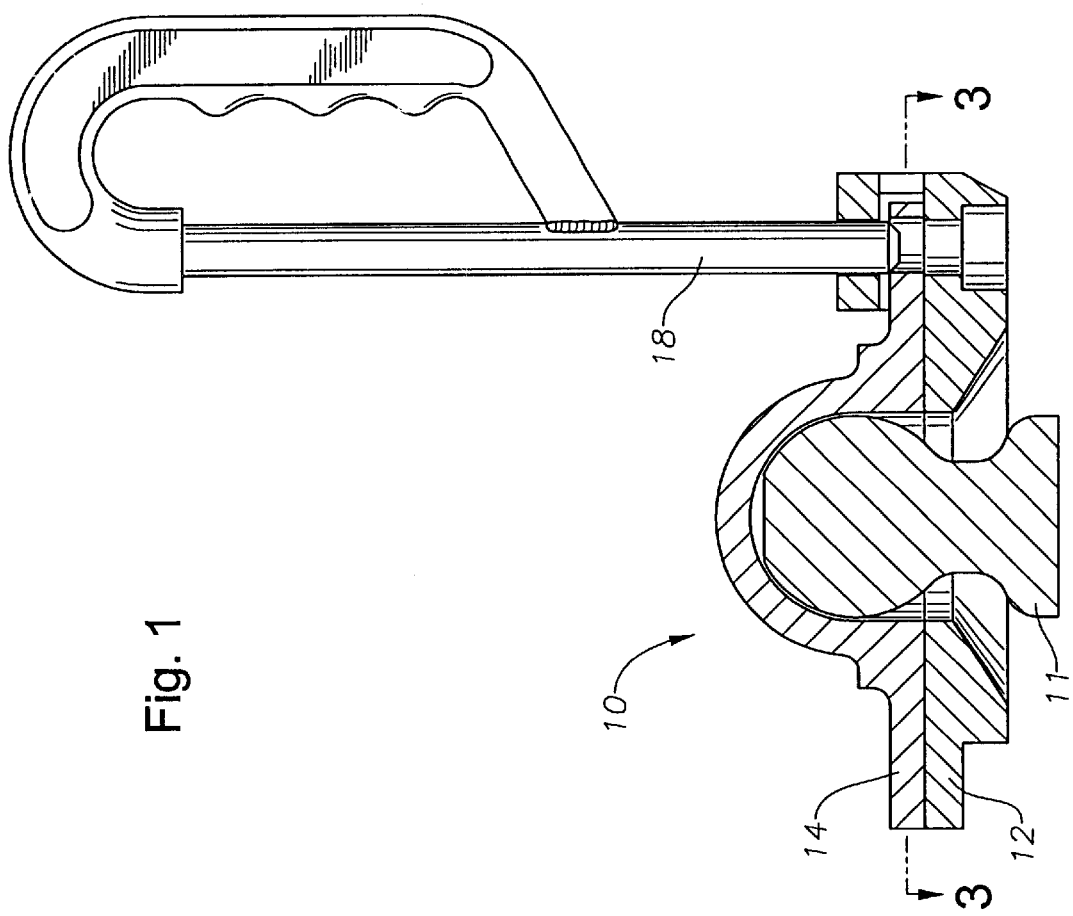
FIG. 1 is a cross-sectional view of the assembled trailer hitch.

In FIG. 1 there is shown a connector 10 for a goose neck trailer hitch. The connector generally includes a base plate 12, a top plate 14 pivotally attached to base plate 12, an engagement spring 16 (see FIGS. 2 and 3) for urging the base plate 12 and the top plate 14 into relative securing positions around a trailer ball 11, and a locking handle 18 for locking the base plate 12 and the top plate 14 relative to one another.

With reference to FIGS. 4 and 5, base plate 12 is provided with a centrally located ball aperture 20 and is generally defined by a top side 22, a bottom side 24, a pivot end 26 and a spring containment end 28. Spring containment end 28 is provided with a handle receiving aperture 29 extending from the top side 22 to the bottom side 24 of base plate 12. Bottom side 24 may optionally include a centering seat 30 or similar structure for urging a trailer ball 11 (FIG. 1) into alignment with aperture 20. In one preferred embodiment, seat 30 is conical is shape. The pitch of the cone may be selected and adjusted to conform with the various requirements of the particular hitch's intended operating parameters.

Provided at spring containment end 28 is a spring enclosure 32 that forms a slot 34 facing the pivot end 26 of base plate 12. Spring enclosure 32 is itself defined by a top surface 36 and side walls 38, 40. A handle mounting aperture 42 is provided in top surface 36, aperture 42 to be collinear with the handle receiving aperture 29 provided in the top side 22 of base plate 12. A spring pocket 44 is defined within the inner portion of side wall 40.

With reference to FIGS. 6 and 7, top plate 14 is generally defined by a top side 50, a bottom side 52, a pivot end 54 and a tab end 56. A dome 58 is provided on top side 50. A vertical tube seating shoulder 60 may also be formed into top side 50, preferable at the intersection of dome 58 and top side 50. Dome 58 is collinearly positioned over a ball receiving aperture 62 formed in top plate 14. Tab end 56 of top plate 14 includes a tab 64. Molded onto the side of tab 64 is spring nipple 66. Passing vertically through tab 64 is handle mounting aperture 68.

Turning back to FIGS. 1, 2 and 3, it is seen that top plate 14 is mounted on base plate 12 such that the two plates are pivotally engaged at their respective pivot ends 54,26. Tab 64 of top plate 14 extends into slot 34 formed by spring enclosure 32. Nipple 66 is formed on tab 64 so as to be adjacent and extend toward spring pocket 44 when top plate 14 and base plate 12 are so assembled. Top plate 14 and base plate 12 are also disposed so that aperture 62 of top plate 14 can be moved into concentric alignment with aperture 20 of base plate 12. Spring 16 seats in spring pocket 44 and over nipple 66.

Figure 2:
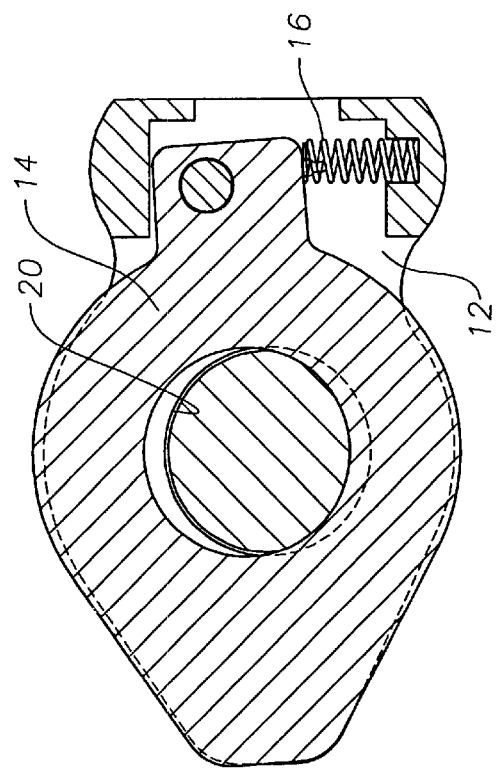
FIG. 2 is a top, partial cut-away view of the trailer hitch in an engaged or at rest position.

The operation of connector 10 will now be explained. FIG. 2 illustrates connector 10 in a neutral or at-rest position.

In this position, top plate 14 is held out of aperture alignment with base plate 12 by spring 16. Specifically, since spring 16 urges base plate 12 to pivot counterclockwise relative to top plate 14, aperture 20 in base plate 12 is likewise pivoted out of alignment with aperture 62 of top plate 14. When connector 10 is mounted on ball 11 and base plate 12 and top plate 14 are disposed in this neutral position, the off-set relationship of base plate 12 and top plate 14 cause connector 10 to lock around ball 11.

Figure 3:
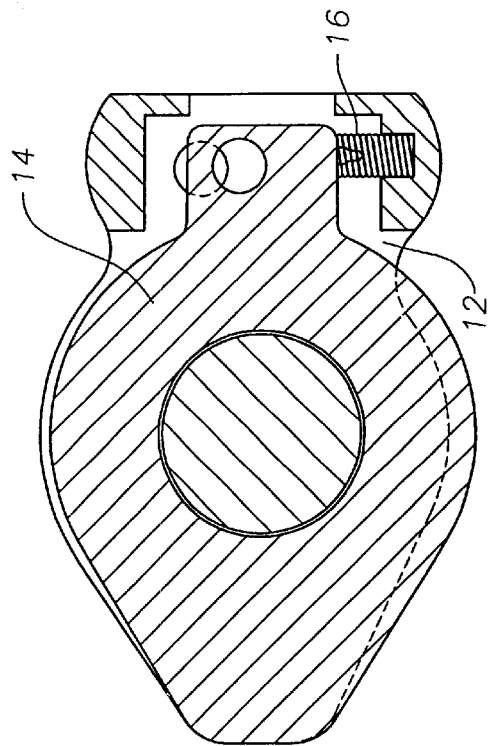
FIG. 3 is a top, partial cut-away view of the trailer hitch in an aligned position to permit a ball to pass through the base and top plates.
Figure 2A:
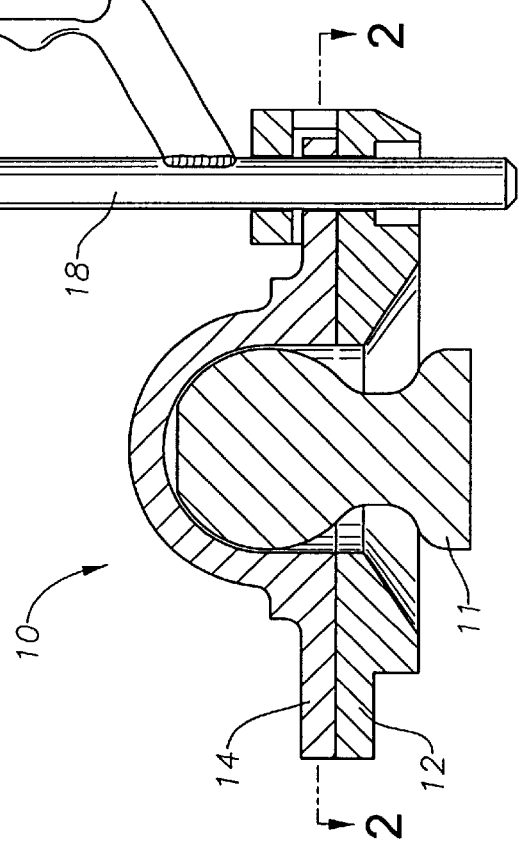
FIG. 2A is a cross-sectional view of the hitch in the engaged position.

FIG. 3 illustrates the relative positions of base plate 12 and top plate 14 as ball 11 is being inserted into connector 10. While aperture 20 and aperture 62 are typically out of alignment with one another, the passage of the head of ball 11 through the adjacent apertures forces said apertures into temporarily aligned. Initially, ball 11 and aperture 20 are aligned with one another as ball 11 engages seat 30 such that base plate 12 and ball 11 are fixed relative to one another while top plate 14 is free to pivot on base plate 12. Under the force of ball 11 pushing through aperture 62 and into dome 58, top plate 14 is urged to pivot clockwise relative to base plate 12, against the force of spring 16. Once ball 11 is seated within dome 58, top plate 14 and ball 11 are now fixed relative to one another. However, since the head of ball 11 is no longer constraining base plate 12, i.e., base plate 12 is now adjacent the narrower neck portion of ball 11, base plate 12 is now freed up to pivot relative to top plate 14. Therefore, under the force of spring 16, base plate 12 pivots clockwise such that aperture 20 is forced out of alignment with aperture 62 and ball 11 is prevented from freely passing back through aperture 20.

In the preferred embodiment, those skilled in the art will understand that spring 16 and base plate 12 function as a locking mechanism and that spring 16 is selected so as to have sufficient spring force to overcome any opposing forces that might be placed on base plate 12 by ball 11 at times other than during engaging and disengaging ball 11 and connector 10. As such, connector 10 is "locked" onto ball 11 by the combination of base plate 12 being urged to a position where ball 11 can not readily pull back through aperture 20 and the pressure of spring 16 that maintains base plate 12 in such a position. It will be noted that when connector 10 is in the neutral or at-rest position described above, it is in the "locked" position to the extent connector 10 is seated on a ball.

In addition to the first locking mechanism formed by spring 16 and base plate 12, connector 10 also utilizes handle 18 as a secondary locking mechanism. Specifically, when connector 10 is in the neutral position, aperture 68 of top plate 14 is aligned with apertures 42 and 29 of base plate 12 under the urging of spring 16. When so aligned, the stem 19 of handle 18 can be passed through the these apertures to secure the relative positions of top plate 14 and base plate 12, thereby functioning as a second "locking mechanism" for connector 10. When this second locking mechanism is engaged, ball 11 is prevented from pulling back through aperture 20 and prematurely disengaging from the connector, thereby functioning as a safety device. Thus, the first locking mechanism is most useful to automatically lock connector 10 on ball 11 during the engaging procedure while the second locking mechanism is most useful as a safety device for more permanently securing connector 10 about ball 11.

In any event, as shown in FIG. 2, one of the benefits of the invention is that spring 16 is protected from the environment or accidental damage by spring enclosure 32. This is accomplished by forming spring seat 44 on the internal surface of spring enclosure 32 so that spring 16 can be completely mounted therein. Furthermore, spring seat 44 and nipple 66 ensure that spring 16 will not unintentionally slip out of alignment between top plate 14 and base plate 12.

An additional novel aspect of the invention is found in shoulder 60. In one preferred embodiment, shoulder 60 is square shaped in its formation around rounded dome 58. As such, the shoulder provides the flexibility to permit use of either a square or round vertical tube as a point of attachment to a trailer. Specifically, in the use of a round tube, the circular tube fits over the circular perimeter of dome 58 and rides on top of shoulder 60. In the use of a square tube, the square tube fits around the square perimeter of shoulder 60.

Turning to the unique fabrication process of the invention, in the preferred embodiment, base plate 12 and top plate 14 are each integrally formed through investment casting. In one preferred embodiment, each plate member is formed of at least 1045 medium carbon steel. In any event, fabrication by casing permits tight tolerances to be cast into each plate member. Furthermore, unlike the prior art, invert casting insures that the characteristics of the first piece are precisely replicated during the casting of subsequent pieces, i.e., casting is not heavily subject to the human creating the piece. In contrast, it is well know that the fabrication techniques generally utilized in the prior art are extremely subject to the skills and quality of the individual person fabricating a piece. As an example, investment casting avoids the need for welding the various components of the base plate and top plate, which is very subject to human error. Notwithstanding this, any time a weld is introduced to a piece, fabrication of the piece becomes more expensive because of the time and additional labor required of such a process. In investment casting as contemplated by the invention, the need for welding labor is obviated. An additional saving can be realized in shorter fabrication times as well since the cast piece is ready for final assembly once it is removed from the mold.

Still yet another benefit to investment casting is that it permits the connector dimensions to be optimized to the connector's performance parameters. For example, dome 58 of connector 10 can be strengthened by increasing the cross-sectional thickness of the dome. In the prior art, since the dome is usually tooled from a flat piece of stock, the cross-sectional thickness of the dome is less than the original thickness of initial work piece. This is very undesirable since it is the dome that often experiences the highest forces in the connector. Not only will the fabrication method of the current invention permit the cross-sectional thickness of both the dome and the face of top plate 14 to be the same, it also provides the flexibility to enhance the dome thickness based on the desired performance parameters of the connector being fabricated. Likewise, other components of a piece may be similarly formed with a more precise eye toward their function.

Investment casting also permits the connector to have various characteristics, which if fabricated using the prior art techniques, would either be very difficult, if not impossible, to build into the piece. For example, nipple 66 would be difficult to fabricate under the old prior art processes most likely requiring either an expensive machining process or difficult welding process. Likewise, it would be cost prohibitive to form features such as spring enclosure 32 or spring seat 44 using the prior art fabrication techniques. The method of the present invention, however, permits these features to be easily formed. The method of the present invention also permits various features to be easily changed or adjusted. For example, the prior art equivalent of seat 30 is usually formed of a stamped plate. In the present invention, seat 30 can be integrally formed as a feature of base plate 12. Furthermore, it can easily be formed to have both the design shape and dimensional parameters best suited for the particular connector's intended use. In one preferred embodiment, seat 30 may be cone shaped. Use of investment casting in the formation of base plate 12 permits the slope of the cone to be easily modified for a particular purpose. Other elements of the piece likewise can easily be modified in their various shape, size, etc. characteristics.

Finally, use of investment casting also permits annealing and normalizing of the connector pieces. This heat treating process is advantageous because it raises the elastic deformation failure threshold of the connector pieces. The prior art pieces, being fabricated from a lower grade material and formed by machining and welding, are not readily treatable using annealing and normalizing. As such, they tend to be more brittle than annealed and normalized components, resulting in a shorter life to failure under working load limits.

The above described trailer hitch provides a dual locking mechanism, a first locking mechanism that automatically clasps a ball as the connector seats on the ball and a second safety locking mechanism to ensure that the ball does not unintentionally disengage from the connector. The trailer hitch of the invention also better protects the spring utilized in its operation, enclosing the spring within a spring enclosure integrally formed on the base plate. Likewise, the trailer hitch is provided with additional elements that are integrally formed with the two primary plates, thereby decreasing the time and labor efforts that were necessary in the prior art to provide comparable elements. Furthermore, since such elements integrally cast into the components, the hitch requires no welding to complete assembly. The use of a heretofore novel method of fabricating the trailer hitch, namely investment casting, also permits the hitch to be formed of higher carbon steel than the prior art. Investment casting also permits the flexibility to easily change various features and elements to conform to the use parameters, without negatively effecting the other components of the connector.

While the preferred embodiment of the subject invention includes a plurality of unique features, it will be readily understood that the various features in combination greatly enhance the function, operation, durability and manufacturability of the trailer hitch mechanism. Thus, while specific features and embodiments of the invention have been described in detail herein, it will be readily understood that the invention encompasses all modifications and enhancements within the scope and spirit of the following claims.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A gooseneck trailer hitch comprising:
   a. an elongated base plate defined by a top side, a bottom side, a first end and a second end, said base plate having base plate features comprising
      (i) a first engaging aperture extending through said base plate, and
      (ii) a spring enclosure provided on the top side of said plate adjacent said second plate end, wherein said spring enclosure is defined by a side wall extending substantially perpendicular from the top side of said base plate and top portion extending from said side wall to be substantially perpendicular with said top side of said base plate thereby defining a slot between said top portion and said top side, said slot opening toward said first end of said base plate;
   b. an elongated top plate defined by a top side, a bottom side, a first end and a second end, the first end of said base plate pivotally attached to the first end of said top plate, said top plate having top plate features comprising
      (i) a second engaging aperture extending through said top plate;
      (ii) a ball housing defined on the top side of said top plate, said ball housing being concentrically located over said second engaging aperture; and
      (iii) a tab defined at the second end of said top plate, said tab at least partially extending into the slot defined by said spring enclosure;
   c. a spring mounted internally in said spring enclosure, said spring mounted between said side wall of said spring enclosure and said tab of said top plate, said spring disposed to urge said base plate and said top plate to pivot relative to one another so that the first engaging aperture of said base plate is maintained in a position out of concentric alignment with second engaging aperture of said top plate.

2. The trailer hitch of claim 1 wherein said base plate features are integrally formed as part of said base plate and wherein said top plate features are integrally formed as part of said top plate.

3. The trailer hitch of claim 1 wherein said base plate features further include a ball seat disposed on the bottom side of said base plate.

4. The trailer hitch of claim 3 wherein said ball seat is concentrically positioned with said second engaging aperture.

5. The trailer hitch of claim 3 wherein said ball seat is conically shaped.

6. The trailer hitch of claim 1, wherein said base plate includes a spring seat formed on the interior of said spring enclosure and said top plate includes a nipple formed thereon and disposed to extend toward said spring seat, whereby a first end of said spring is seated in said spring seat and a second end of said spring is mounted on said nipple.

7. The trailer hitch of claim 1, wherein said top plate is further provided with a pair of axially aligned locking apertures, one of said locking apertures disposed in the top portion of said spring enclosure and the other of said locking apertures disposed at the second end of said top plate, and wherein said bottom plate is provided with a locking aperture extending through said tab, such that said bottom plate locking aperture can be axially aligned with said top plate locking apertures.

8. The trailer hitch of claim 7, further including a locking pin, wherein said locking pin is disposed to pass through said base plate locking apertures and said top plate locking apertures when said apertures are aligned.

9. The trailer hitch of claim 1, wherein said top plate features further include a shoulder disposed at the intersection of said ball housing and said top side of said top plate.

10. The trailer hitch of claim 6, wherein said base plate features are integrally formed as part of said base plate and wherein said top plate features are integrally formed as part of said top plate.

11. The trailer hitch of claim 1, wherein said base plate and said top plate are formed of investment casting.

* * * * *